(12) United States Patent
Dellora et al.

(10) Patent No.: US 6,681,575 B2
(45) Date of Patent: Jan. 27, 2004

(54) TURBOCOMPOUND INTERNAL COMBUSTION ENGINE

(75) Inventors: Giancarlo Dellora, Settimo Torinese (IT); Werner Zaehner, Rehetobel (CH)

(73) Assignees: IVECO FIAT S.p.A., Turin (IT); IVECO Motorenforschung AG, Arbon (CH)

( * ) Notice: Subject to any disclaimer, the term of this patent is extended or adjusted under 35 U.S.C. 154(b) by 0 days.

(21) Appl. No.: 09/971,817

(22) Filed: Oct. 5, 2001

(65) Prior Publication Data

US 2002/0062646 A1 May 30, 2002

(30) Foreign Application Priority Data

Oct. 6, 2000 (IT) .................. TO2000A000940

(51) Int. Cl.$^7$ ................................. F02G 3/00
(52) U.S. Cl. ..................... 60/624; 60/614; 60/602
(58) Field of Search .................... 60/624, 614, 602

(56) References Cited

U.S. PATENT DOCUMENTS

| | | | |
|---|---|---|---|
| 4,452,043 A | * 6/1984 | Wallace | 60/624 |
| 4,884,407 A | 12/1989 | Hatanaka | 60/624 |
| 5,119,633 A | * 6/1992 | Brooks et al. | 60/624 |
| 5,142,868 A | * 9/1992 | Woon et al. | 60/624 |
| 5,555,730 A | 9/1996 | Hope | 60/606 |
| 5,884,482 A | * 3/1999 | Lange et al. | 60/624 |
| 6,286,312 B1 | * 9/2001 | Bertilsson | 60/624 |

FOREIGN PATENT DOCUMENTS

EP 0420705 A1 4/1991

* cited by examiner

Primary Examiner—Thomas Denion
Assistant Examiner—Thai-Ba Trieu
(74) Attorney, Agent, or Firm—Zito tlp; Joseph J. Zito

(57) ABSTRACT

A turbocompound internal combustion engine having a turbocharger with a variable-geometry turbine; and an auxiliary turbine, which is located downstream from the turbine of the turbocharger, provides for recovering energy from the exhaust gas, and is connected mechanically to the drive shaft of the engine via a transmission; a control device compares the rotation speed of the auxiliary turbine, detected by means of a sensor, with a range of permissible speeds calculated on the basis of the speed of the drive shaft, and controls fuel supply to the engine and the geometry of the variable-geometry turbine to maintain the speed of the auxiliary turbine within predetermined limits in the event of a fault on the transmission.

9 Claims, 2 Drawing Sheets

TURBOCOMPOUND INTERNAL COMBUSTION ENGINE

The present invention relates to a so-called "turbocompound" internal combustion engine, in particular for an industrial vehicle.

BACKGROUND OF THE INVENTION

"Turbocompound" internal combustion engines are known, which comprise an auxiliary turbine downstream from the turbocharger turbine and connected mechanically to the drive shaft to recover and convert part of the residual energy of the exhaust gas into mechanical power for the drive shaft.

The auxiliary turbine and drive shaft are normally connected mechanically (here intended in the broader sense of the ability to transfer mechanical power, as opposed to a "rigid connection") by a transmission comprising a gear reducer and a hydraulic joint permitting a certain amount of "slippage". In the event of a breakdown of the hydraulic joint or relative hydraulic supply circuit, the auxiliary turbine may become mechanically disconnected from the drive shaft, and so unaffected by the braking torque produced by rotation of the drive shaft, so that the speed of the turbine, driven exclusively by the exhaust gas, may exceed the safety limit, thus resulting in breakdown of the turbine.

By way of a solution to the problem, turbocompound engines have been devised featuring a safety control device for detecting the oil pressure of the hydraulic joint, and which intervenes when the pressure falls below a predetermined limit. This type of device, however, is only effective and only intervenes in the case of hydraulic faults, whereas faults in the torque transmission of the hydraulic joint have been found to occur, for example, even when the system circuitry is sound but the oil particularly dirty.

SUMMARY OF THE INVENTION

It is an object of the present invention to provide a turbocompound internal combustion engine featuring an auxiliary turbine speed control device designed to eliminate the aforementioned drawbacks typically associated with known devices.

According to the present invention, there is provided a turbocompound internal combustion engine comprising a drive shaft; a turbocharger comprising a turbine and a compressor; an auxiliary turbine located along the path of the exhaust gas, downstream from said turbine of said turbocharger; and transmission means between said auxiliary turbine and said drive shaft; characterized by comprising a first angular speed sensor for detecting the rotation speed of said auxiliary turbine; and a control device for controlling the rotation speed of said auxiliary turbine, and which is connected to said first sensor and in turn comprises calculating means for calculating a range of permissible values of said rotation speed of said auxiliary turbine, comparing means for comparing the rotation speed of said auxiliary turbine measured by said first sensor with said range of permissible values, and control means for controlling operating parameters of the engine in response to an enabling signal generated by said comparing means, so as to maintain said speed of said auxiliary turbine within said range of permissible values.

The present invention also relates to a method of controlling a turbocompound internal combustion engine comprising a drive shaft; a turbocharger comprising a turbine and a compressor; an auxiliary turbine located along the path of the exhaust gas, downstream from said turbine of said turbocharger; and transmission means between said auxiliary turbine and said drive shaft; said method being characterized by comprising the steps of measuring the rotation speed of said auxiliary turbine by means of a sensor; calculating a range of permissible values of said rotation speed of said auxiliary turbine; comparing the rotation speed of said auxiliary turbine measured by said sensor with said range of permissible values; and controlling operating parameters of the engine in response to the outcome of said comparing step, so as to maintain said speed of said auxiliary turbine within said range of permissible values.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
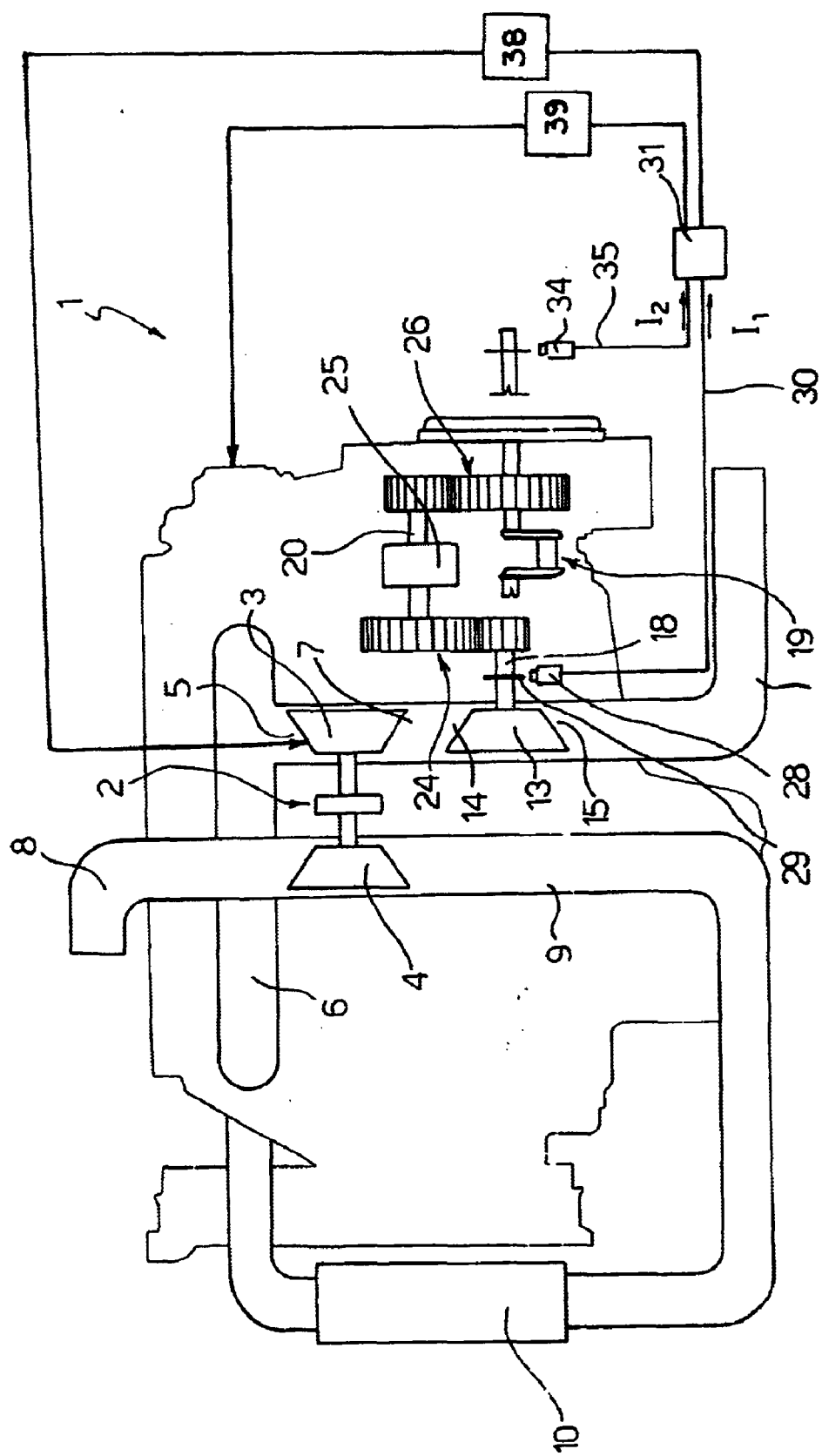
FIG. 1 shows a diagram of a turbocompound engine in accordance with the present invention.

Number 1 in FIG. 1 indicates as a whole an internal combustion engine for an industrial vehicle.

Engine 1 comprises a turbocharger 2 comprising a turbine 3 and a compressor 4 fitted to a common shaft. Turbine 3 has an inlet 5 connected to an exhaust manifold 6 of engine 1, and an outlet 7. Compressor 4 has an inlet connected to an air intake circuit 8, and an outlet 9 connected to an intake manifold (not shown) of the engine via an intercooler 10.

Engine 1 also comprises an auxiliary or power turbine 13 having an inlet 14 connected to outlet 7 of turbine 3, and an outlet 15 connected to an exhaust system 16.

Auxiliary turbine 13 is fitted to a shaft 18, which is connected mechanically to a drive shaft 19 of engine 1 by a transmission indicated as a whole by 20.

More specifically, transmission 20 comprises a first gear reducer 24; a hydraulic joint 25; and a second gear reducer 26 connected at the output to drive shaft 19.

According to the present invention, an angular speed sensor 28—e.g. comprising a pulse generating wheel 29 associated with shaft 18 or any other member rotating at fixed speed with respect to it—detects the rotation speed of auxiliary turbine 13, is connected to a first input 30 of a device 31 for controlling fuel supply and the geometry of turbine 3, and supplies input 30 with a signal I1 related to the speed of auxiliary turbine 13. A second sensor 34, of conventional type (not shown) and associated, for example, with the input shaft of the vehicle transmission to detect the angular speed of the drive shaft (hereinafter referred to simply as "engine speed", is connected to and supplies a second input 35 of device 31 with a signal I2.

Figure 2:
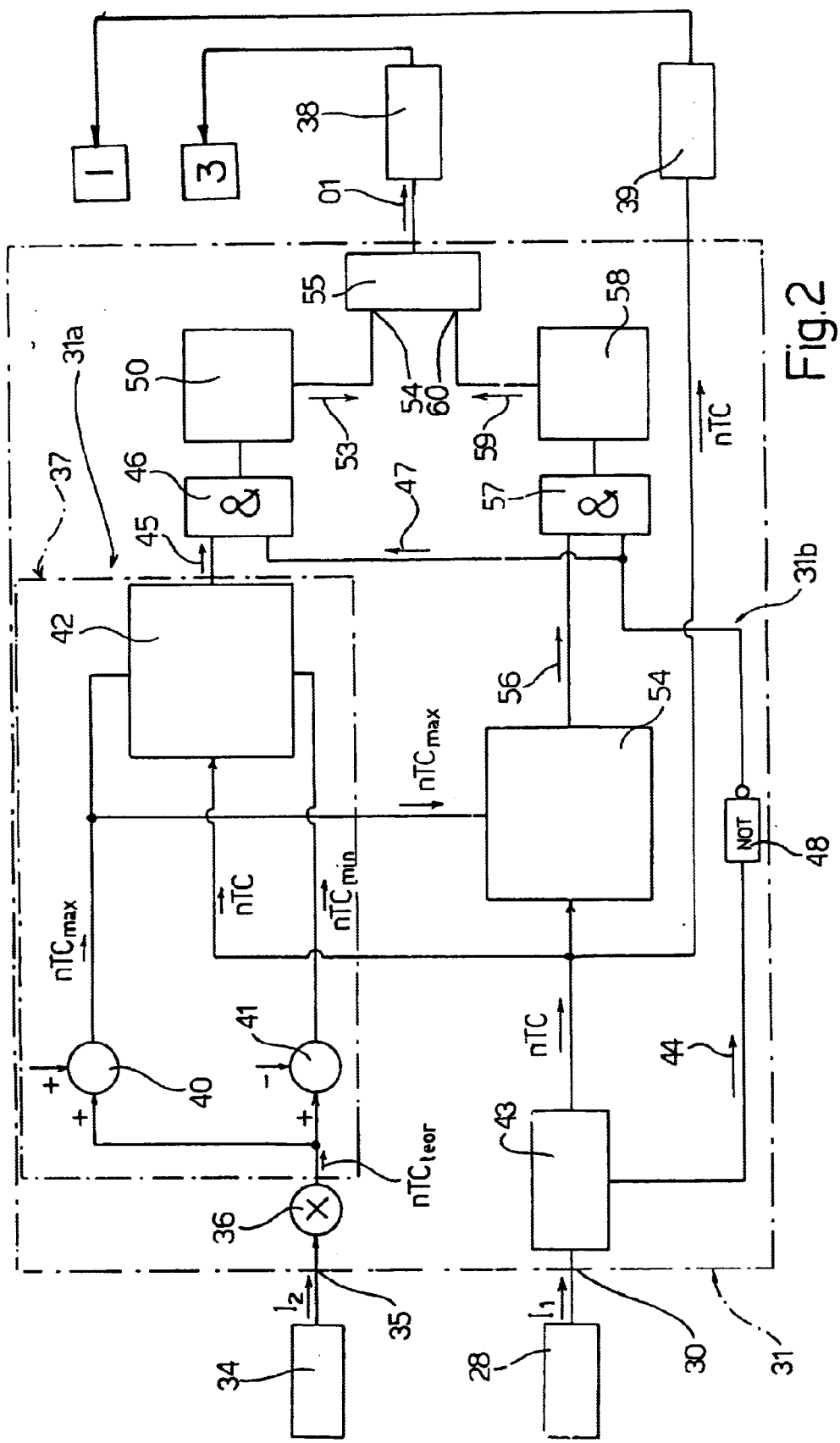
FIG. 2 shows a block diagram of a control device of the FIG. 1 engine.

FIG. 2 shows a block diagram of device 31.

Device 31 substantially comprises a first block 36 for calculating the theoretical speed nTCteor of auxiliary turbine 13 on the basis of signal I2. Block 36 is connected to second input 35, substantially comprises a multiplier for multiplying the engine speed value by a constant taking into account the transmission ratio of transmission 20, and is connected at the output to a block 37, which compares the actual speed of the auxiliary turbine with a range of permissible values defined on the basis of the theoretical speed calculated above. More specifically, block 37 comprises a first adder 40, which calculates a theoretical maximum speed nTCmax of auxiliary turbine 13 by adding a constant (e.g. 10,000 rpm) to nTCteor; and a second adder 41, which calculates a theoretical minimum speed nTCmin of auxiliary turbine 13 by subtracting a constant (e.g. 20,000 rpm) from nTCteor.

The two values nTCmax and nTCmin are supplied to a first threshold comparator 42 defining a range of permissible values of the speed nTC of auxiliary turbine 13. Speed nTC is calculated in known manner, on the basis of signal I1 from sensor 28, in an interface block 43 connected to first input 30 of device 31, and which also generates in known manner a diagnostic signal 44 indicating the operating state of sensor 28, and having, for example, a 0 logic value when sensor 28 is operating correctly, and a 1 logic value in the event signal I1 of sensor 28 is implausible, e.g. absent or inevaluable.

Threshold comparator 42 receives signal nTC from interface block 43, and compares it with threshold values nTCmax and nTCmin. More specifically, threshold comparator 42 generates a digital signal 45 of value 1 if nTC is between nTCmax and nTCmin, and of value 0 if nTC is outside the range defined by nTCmax and nTCmin.

Signal 45 is supplied to one input of a first AND gate 46, the other input of which is supplied with a signal 47 equal to diagnostic signal 44 inverted by a NOT gate 48. The output of AND gate 46 is connected to a time filtering block 50, which generates a signal 53 of the same logic value as the input signal when the input signal remains stable for a predetermined time interval. Signal 53 is supplied to a reset input 54 of a flip-flop 55.

The nTCmax value calculated by first adding block 40 is used to set the switching threshold of a second threshold comparator 54, which receives signal nTC generated by interface block 43, and generates a signal 56 of logic value 1 if nTC is greater than nTCmax, thus indicating a malfunction of auxiliary turbine 13, and of logic value 0 if nTC is less than nTCmax.

Output signal 56 from comparator 54 and output signal 47 from NOT gate 48 are supplied to the inputs of a second AND gate 57.

The output of AND gate 57 is connected to a second time filtering block 58, which generates a signal 59 of the same logic value as the input signal when the input signal remains stable for a predetermined time interval. Signal 59 is supplied to the set input 60 of flip-flop 55.

Flip-flop 55 generates an output signal O1, which is supplied to a block 38 for controlling the geometry of turbine 3, and to a block 39 for controlling fuel supply by the injectors. Block 39, operation of which is described in detail later on, also receives signal nTC relative to the speed of auxiliary turbine 13.

Operation of device 31, partly obvious from the foregoing description, is as follows.

To begin with, sensor 28 is assumed to be operating correctly, so that signal 44 is of value 1 and has no effect on the outputs of AND gates 46, 57, which depend exclusively on the value of nTC.

If the speed nTC of turbine 13 falls within the range of permissible values, and sensor 28 is operating correctly, the output of first AND gate 46 is 1; and, if this value remains stable over time, the reset input of flip-flop 55 also equals 1.

If nTC falls within the range of permissible values, the condition nTC<nTCmax is also definitely confirmed, so that the output of second threshold comparator 54 is 0, the output of second AND gate 57 is 0, and, if this value remains stable over time, the set input of flip-flop 55 is also 0.

The output signal O1 of flip-flop 55 is zero, so there is no intervention on the part of blocks 38, 39.

The upper branch of the FIG. 2 block diagram—indicated as a whole by 31a—therefore acts as a recognition circuit for determining correct operation.

If the speed nTC of turbine 13 does not fall within the range of permissible values, and sensor 28 is operating correctly, the output of first AND gate 46 is 0; and, if this value remains stable over time, the reset input of flip-flop 55 also equals 0.

If nTC is greater than nTCmax, the output of second threshold comparator 54 is 1, the output of second AND gate 57 is 1, and, if this value remains stable over time, the set input of flip-flop 55 is also 1.

In this case, signal O1 equals 1 and a correction of the geometry of turbine 3 and fuel supply is enabled.

The lower branch 31b of the block diagram therefore acts as a recognition circuit for determining a malfunction.

Conversely, if nTC is less than nTCmin, the output of second threshold comparator 54 is 0, the output of second AND gate 57 is 0, and, if this value remains stable over time, the set input of flip-flop 55 is also 0. Both the inputs of flip-flop 55 are 0, and the pre-existing situation is maintained.

The same applies in any case (i.e. regardless of the detected nTC value) in the event a fault is detected on sensor 28 (i.e. a 1 value of diagnostic signal 44); in which case, signal 47 is 0, so that the outputs of both AND gates 46, 57 are 0.

In the presence of a logic 1 value of signal O1, block 38 sets the geometry of turbine 3 to the full-open condition, thus reducing supercharging; and, at the same time, block 39 immediately reduces fuel supply by the injectors to a predetermined start value, and then modulates the full supply value to keep the speed of auxiliary turbine 13 constant and equal to an acceptable value, e.g. nTCmax.

The advantages of engine 1, and particularly control device 31, according to the present invention will be clear from the foregoing description.

In particular, by device 31 determining the rotation speed of auxiliary turbine 13, any malfunction affecting the mechanical performance of the turbine is detected.

The control logic of device 31 only provides for correcting the operating parameters of the engine (geometry of turbine 3 and fuel supply) when the integrity of auxiliary turbine 13 is definitely at risk. That is, it does not intervene when the fault may possibly depend on a malfunction of sensor 28, or when the fault does not threaten the integrity of turbine 13 (nTC<nTCmin).

Moreover, intervention is designed to still allow albeit emergency operation of the vehicle, by supply to the engine being controlled to prevent overacceleration of auxiliary turbine 13.

Clearly, changes may be made to engine 1, and in particular to device 31, without, however, departing from the scope of the accompanying claims.

What is claimed is:

1. A turbocompound internal combustion engine comprising:
   a drive shaft;
   a turbocharger comprising:
      a turbine and
      a compressor;
   an auxiliary turbine located along the path of the exhaust gas, downstream from said turbine of said turbocharger; and transmission means between said auxiliary turbine and said drive shaft said engine further comprising:
  a first angular speed sensor for detecting the rotation speed of said auxiliary turbine; and
  a control device for controlling the rotation speed of said auxiliary turbine, and which is connected to said first angular speed sensor and in turn comprises:
    calculating means for calculating a range of permissible values of said rotation speed of said auxiliary turbine,
    comparing means for comparing the rotation speed of said auxiliary turbine measured by said first sensor with said range of permissible values, and
    control means for controlling operating parameters of the engine in response to an enabling signal generated by said comparing means, so as to maintain said speed of said auxiliary turbine within said range of permissible values;
    said calculating means for calculating said range of permissible values including a second angular speed sensor for detecting the rotation speed of the drive shaft: and processing means for calculating at least a maximum value of the speed of said auxiliary turbine on the basis of the speed of the drive shaft.

2. The engine as claimed in claim 1, characterized in that said turbine of said turbocharger is a variable-geometry type; said control means for controlling operating parameters of the engine comprising means for varying the geometry of said variable-geometry turbine.

3. The engine as claimed in claim 2, characterized in that said means for varying the geometry of the variable-geometry turbine comprise means for setting a full-open condition of said variable-geometry turbine.

4. The engine as claimed in claim 1, characterized in that said control means for controlling operating parameters of the engine comprise means for varying fuel supply, to maintain said speed of said auxiliary turbine within said maximum value.

5. The engine as claimed in claim 1, characterized in that said control device includes means for determining the plausibility of a signal received from said first sensor; and disabling means for disabling said control means for controlling operating parameters of the engine in response to detection of an implausibility condition of said signal.

6. A method of controlling a turbocompound internal combustion engine comprising:
  a drive shaft;
  a turbocharger comprising:
    a turbine and
    a compressor;
  an auxiliary turbine located along the path of the exhaust gas, downstream from said turbine of said turbocharger; and
  transmission means between said auxiliary turbine and said drive shaft;
  said method including the steps of:
    measuring the rotation speed of said auxiliary turbine by means of a first sensor;
    calculating a range of permissible values of said rotation speed of said auxiliary turbine;
    comparing the rotation speed of said auxiliary turbine measured by said first sensor with said range of permissible values; and
    controlling operating parameters of the engine in response to the outcome of said comparing step, so as to maintain said speed of said auxiliary turbine within said range of permissible values,
  said operating parameters including the geometry of said turbine of said turbocharger and fuel supply of said engine.

7. The method as claimed in claim 6, characterized in that said step of controlling operating parameters of the engine comprises the operations of setting said turbine of said turbocharger to a full-open condition; and modulating fuel supply to maintain the rotation speed of the auxiliary turbine within a maximum limit.

8. The method as claimed in claim 6, characterized by comprising the steps of determining the plausibility of a signal received from said first sensor; and disabling said step of controlling said operating parameters of the engine in response to an implausibility condition of said signal.

9. A method of controlling a turbocompound internal combustion engine comprising:
  a drive shaft;
  a turbocharger comprising:
    a turbine and
    a compressor;
  an auxiliary turbine located along the path of the exhaust gas, downstream from said turbine of said turbocharger; and
  transmission means between said auxiliary turbine and said drive shaft; said method including the steps of:
    measuring the rotation speed of said auxiliary turbine by means of a first sensor;
    calculating a range of permissible values of said rotation speed of said auxiliary turbine;
    measuring the rotation speed of the drive shaft of said engine by means of a second angular speed sensor;
    calculating a range of permissible values of the speed of said auxiliary turbine on the basis of the speed of the drive shaft, said range being defined by at least a maximum value of the speed of said auxiliary turbine;
    comparing the rotation speed of said auxiliary turbine measured by said first sensor with said range of permissible values; and
    controlling operating parameters of the engine in response to the outcome of said comparing step, so as to maintain said speed of said auxiliary turbine within said range of permissible values.

* * * * *